US008370001B2

(12) United States Patent
Love

(10) Patent No.: US 8,370,001 B2
(45) Date of Patent: Feb. 5, 2013

(54) POOL TEMPERATURE CONTROLLER

(75) Inventor: Chris Love, Thornhill (CA)

(73) Assignee: Chris Love, Thornhill, Ontario (CA)

( * ) Notice: Subject to any disclaimer, the term of this patent is extended or adjusted under 35 U.S.C. 154(b) by 600 days.

(21) Appl. No.: 12/320,945

(22) Filed: Feb. 9, 2009

(65) Prior Publication Data

US 2009/0204263 A1  Aug. 13, 2009

Related U.S. Application Data

(60) Provisional application No. 61/006,974, filed on Feb. 8, 2008.

(51) Int. Cl.
*G05D 23/00* (2006.01)
(52) U.S. Cl. ........................... 700/300; 700/282
(58) Field of Classification Search .................. 700/300, 700/281, 282, 299; 702/130
See application file for complete search history.

(56) References Cited

U.S. PATENT DOCUMENTS

| | | | | |
|---|---|---|---|---|
| 5,471,851 | A * | 12/1995 | Zakryk | 62/238.6 |
| 7,043,341 | B2 * | 5/2006 | Gallupe et al. | 700/300 |
| 7,469,550 | B2 * | 12/2008 | Chapman et al. | 62/157 |
| 2007/0233420 | A1 * | 10/2007 | Potucek et al. | 702/130 |
| 2007/0244576 | A1 * | 10/2007 | Potucek et al. | 700/55 |
| 2008/0060787 | A1 * | 3/2008 | Bobel | 165/58 |

* cited by examiner

*Primary Examiner* — Mohammad Ali
*Assistant Examiner* — Nathan Laughlin
(74) *Attorney, Agent, or Firm* — Aaron Edgar; Gowling LaFleur Henderson LLP

(57) ABSTRACT

A device for controlling the temperature of a swimming pool is disclosed. The device measures the temperature of the water as well as other environmental conditions (such as air temperature). The device controls a circulation pump, which circulates water throughout the pool. The pool water exchanges heat with the surfaces of the water (including the side walls, ground and surface air) when a heat differential exists between the water and the surfaces. When the water is circulated throughout the pool it increases the volume of water that exchanges heat with the surfaces, thus cooling or heating the water depending on the temperature of the surfaces. A target temperature is entered into the device and using this target temperature the device automatically controls the pump in order to take advantage of the heat exchange between the water and the water's surfaces to alter the water temperature in the direction of the target temperature. Additionally a heating element may be used to supplement the heating operation of the circulation pump.

18 Claims, 8 Drawing Sheets

POOL TEMPERATURE CONTROLLER

This application claims the benefit of U.S. Provisional Application No. 61/006,974 Filed Feb. 8, 2008, in its entirety herein incorporated by reference.

FIELD OF THE INVENTION

This invention relates to devices for heating and cooling swimming pools and in particular to automated devices for controlling the temperature of pools.

BACKGROUND OF THE INVENTION

Above ground pools are a less expensive alternative to the more expensive permanent in-ground pools. Newer above ground pools, which are being made of vinyl, or the older models based on aluminum walls clad in a vinyl liner are thin and a poor thermal insulator. In addition, the pool walls have a significant amount of surface area exposed to air, either directly via the pool's surface, or indirectly through the pool wall. As a result, these pools can be affected significantly by outdoor temperature swings which can prohibit a stable and desirable user temperature from being maintained. This problem is amplified throughout the pool season where cooler periods result in lowered pool temperatures that are undesirable to the user resulting in diminished use of the pool. As well, it is recognized that higher pool temperatures above a desired water temperature can also be undesirable.

The problem is not of being able to heat a pool from 0 C to (an example desired temperature of) 29 C, but to regulate the temperature about 29 C± several degrees throughout the pool season. As the natural ambient temperature is typically above (approximately) 22 C for most of the pool season, the pool will reach this temperature rapidly from the time that tap water (10-15 C) is added at the beginning of the pool season. It is also true that for most of the pool season, the desired/set target pool temperature is above the ambient outdoor temperature.

To summarize, above ground pool use is significantly affected by changing ambient temperatures which are different than the desired target temperature, leading to cooler or warmer undesirable pool temperatures, which result in diminished pool use. The challenge then is to auto-regulate the pool temperature about the desired target temperature ± several degrees throughout the pool season.

Also recognized is that energy efficiency is a desirable goal for the operation of pools (in-ground & above-ground), which are considered luxury items that can be energy intensive depending upon actual pool usage.

In order to overcome periods of cooler outdoor temperatures, which drive the pool temperature below the desired target temperature, several existing techniques can be employed to help raise the pool's temperature. One example is a pool heater that is controlled via sensing the actual water temperature, whereby a sensed water temperature below a set target temperature causes the pool heater to activate. Otherwise, the pool heater can be operated manually (i.e. switched on or off irrespective of the actual water temperature). However, use of a pool heater requires energy usage that many would deem to be an undesirable usage of energy resources.

SUMMARY OF THE INVENTION

It is an object of the present invention to address at least one of the above presented disadvantages.

The presently disclosed controller allows the user to incorporate the ambient outdoor temperature together with the user's desired target temperature to take advantage of the natural heating differentials available through the day and night. Recognizing the natural heating and cooling influences on the pool surrounded by air creates an opportunity to either heat or cool the pool by running only a circulation pool pump. The pool pump alone uses less electricity as compared to the operation of the pump in combination with a heating/cooling element. An automated decision making program (i.e. the controller) activates the more powerful, but more costly heating element, when it recognizes that it cannot achieve the heating goal in a reasonable amount of time using only the circulation pump. This is an intelligent decision based on several factors including, but not limited to: the time of day, the air-to-water temperature differential, the water-to-target temperature differential, the heating/cooling rate of the pool using the pool pump alone (based on pool dimensions and/or water volume). This controller allows a user to take advantage of many heating/cooling techniques to minimize the use of man-made energy. Another factor could be a temperature range, such that the controller is configured to only or otherwise preferentially use water circulation (i.e. pump without element usage) if the temperature stays within the range. For temperatures outside of the range, and/or for certain defined periods of the day/night, the controller could be configured to always or otherwise preferentially use the heating element with the pump.

Accordingly, environmental, also referred to as ambient condition, sensors (e.g. air/ground temperature, precipitation meter, solar intensity, etc.) are connected to the controller, in order to facilitate decision-making capabilities of the controller on whether or not the pool pump should be operated in combination with the heating/cooling element to achieve the desired/set water temperature (or range) for a desired period of time.

One aspect provided is a pool temperature device for monitoring water temperature of a pool, the device comprising: a user interface for receiving a target temperature; an interface for receiving environmental condition information from at least one environmental sensor and for receiving temperature information from a pool water temperature sensor; and a processor configured for controlling the operation of a heating element to be used in providing for the water temperature of the pool reaching the target temperature based on the received environmental condition information and the received temperature information, the processor further configured for making a decision on whether to activate the heating element based on the received environmental conditions.

A further aspect provided is a method for controlling the temperature of water in a pool comprising: receiving the temperature of the water in the pool; receiving environmental condition information; receiving a target temperature range; and activating a heating element for heating the pool water when the environmental conditions are determined insufficient to heat the pool water temperature to the target temperature.

DETAILED DESCRIPTION

Device 100

Figure 1:
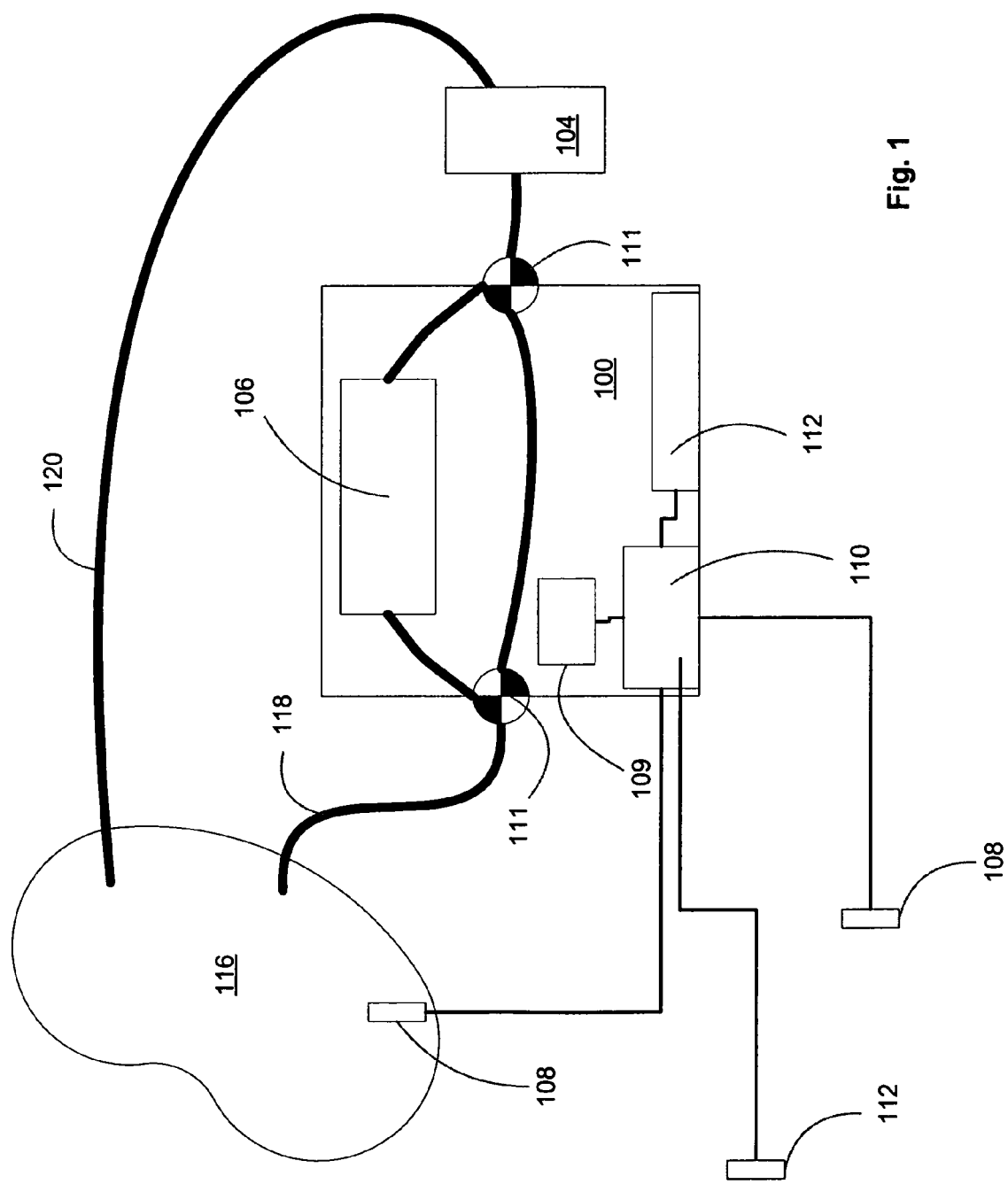
FIG. 1 is a block diagram of a circulation pump and a pool.

Elements of the pool temperature controller device 100 for controlling the temperature of a pool 116 are depicted in FIG. 1 and can include an electronic controller 110, a pump 104 and a heat element 106. One or more sensors 112 can be attached to the device 100, including for example an air thermometer 110, or a thermistor 108 for measuring the temperature of the water in the pool 116 as well as measuring or otherwise giving an indication of the ambient conditions (e.g. air temperature, ground temperature, temperature forecasts, solar intensity, weather forecasts concerning amount of precipitation, etc). The controller device 100 is configured so as to monitor or otherwise control the operation of the pump 104 and the heat element 106 via the electronic controller 110. It is recognized that the electronic controller can be defined to include the automatic operation of mechanical controls such as flow valves for directing the flow of the pool 116 water to and from the pump 104 and optionally the heat element(s) 106. It is also recognized that the pool 116 can be located outside of a residence 504 (see FIG. 5) such as an outdoor pool 116 or located inside of the residence 504 (see FIG. 5) such as an indoor pool 116.

Heat Element 106

The heating element 106 has an inlet and outlet to which the pool 116 water hoses are connected. In this way, the incoming pool 116 water is actively heated or cooled and returned to the pool 116, thus warming or cooling the pool water respectively. Alternatively, the element 106 could also be immersed directly in the pool 116 water itself. It is recognized that the heat element 106 is an active heat transfer element (i.e. using the flow of water through the heat element 106) for transferring heat to/from the water of the pool 116 that is directed through the heat element 106. Other heat/cooling sources for transferring heat to/from the pool 116 water are environmental or ambient heat sources such as, but not limited to: air temperature adjacent to the pool 116; ground temperature adjacent to the pool 116; solar intensity on the surface of the pool 116; precipitation into the pool 116; addition or drainage of a specified quantity of water with respect to the pool 116, at a specified temperature, from a water source external to the pool 116; wind speed adjacent to the pool; covered state of the pool 116 (e.g. covered or not covered for a specified period of time); etc. It is recognized that the ambient sources do not involve having a measured flow of water from the pool 116 through a heat element 106.

The heat element 106 is considered as one or more devices that can add and/or subtract heat energy to/from pool 116 water delivered to the heat element 106 via the pump 104. It is recognized that the heat element(s) 106 can be located onboard and/or external to the device 100 and can include examples such as but not limited to: an electrical heating coil; a heat exchanger coupled to a solar heat collector; a heat exchanger coupled to a natural gas/propane heater; a heat exchanger coupled to a heat pump such as used for heating/cooling of a home adjacent to the pool 116; a heat exchanger coupled to an air conditioner unit; etc. The pump 104 is considered a device used to circulate water in the pool 116 and between the pool 116 and the heat element 106 controlled by the device 100. It is also recognized that the pump 104 can be located onboard and/or external to the device 100. For example, the device 100 can have operational control over a primary heat element 106 (e.g. an electrical heater) and a secondary heat element 106 (e.g. a solar heater) and can make decisions for usage of the primary and/or secondary heat elements 106, based on environmental conditions and a schedule 108 that is used to define a target temperature range and/or a target time period for the target temperature range, as further described below.

Further, it is recognized that a solar water heater would be considered as a heat element 106 rather than an ambient heat source, as the solar water heater during operation has water circulated from the pool (and back again) through its corresponding heat exchanger (e.g. a plurality of black tubing). This is in contrast to solar heating effects experienced by the pool 116, based on the exposure of the pool surface (e.g. top surface only in the case of an inground pool) to incident sunlight. Incident sunlight would be considered as an ambient heat source.

Figure 5:
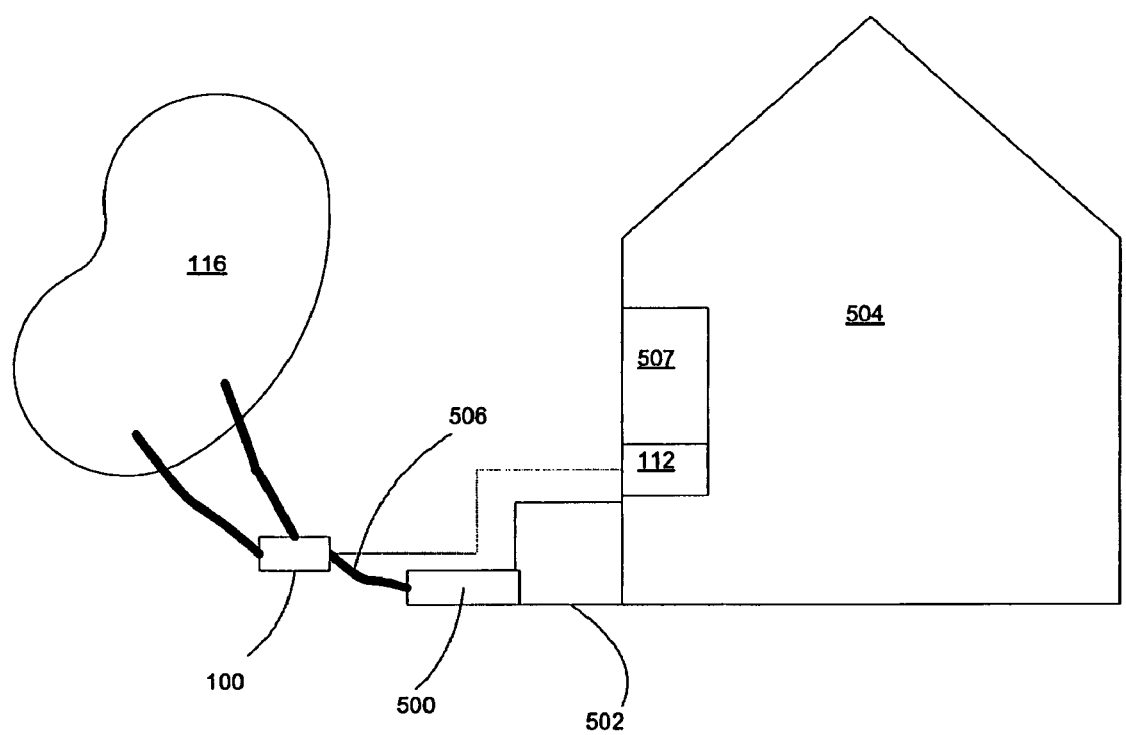
FIG. 5 is a block diagram of a heat exchange style device.

FIG. 5 depicts a heat exchange style device 500 as an example of the heat element 106, which could connect to an air conditioner system 502, used to cool a building 504. In this implementation, the air conditioner's 502 heat discharge would be captured by the heat exchange device 500 and used to warm the water in the pool 116 via a hose 506 connected to the pump 104. Simultaneously, the cool pool 116 water brought by the hose 506 and exposed indirectly with the air conditioner's 502 refrigerant via the heat exchange style device 500 would help cool the air conditioner's 502 refrigerant. This symbiotic relationship is beneficial as air conditioners are typically active during the same seasons as pools. Additionally, the power used to drive the air conditioner 502 can be considered a sunk cost with reference to the device 100 resulting in significantly reduced overall operating costs to the consumer recognizing that the majority of the hydro costs are associated with the heating element. In this case, the controller 101 is aware of when the air conditioner 502 is operational and would operate the pool pump 104 (and any flow valves, switches 300) accordingly in order to circulate the pool water in conjunction with the air conditioner 502 operation.

Alternatively, a solar device 106, where the sun's energy is captured and converted into heat, may be used to warm the pool's 116 water. A further alternative is the use of a propane or a natural gas device 106 for generating heat through combustion of the gas. The combustion, which generates heat, may then used to warm the pool 116 water.

Electronic Controller 110

The electronic controller 110 is used to monitor the operation (e.g. on/off) of the pump 104, the flow of water through the heat element(s) 106 via one or more valves 111 that can be used to bypass the flow of pool 116 water through the heat element(s) 106 while still allowing for circulation of the water in the pool 116; optionally the operation (e.g. on/off) of the heat element 106 in the case of an electrical heater; and operation and/or configuration of the schedule 108 that is used to control sequential and/or singular operation of the heat element(s) 106 based on environmental conditions, as further described below. As further described below by example, the controller 110 can use a defined schedule 108 to make decisions on sequential/simultaneous operation of the heat element(s) 106 and pump 104 based on desired target temperature(s) and/or target temperature(s) for a specified time period as defined in the schedule 108. It is recognized that the controller 110 is configured to make decisions on deemed efficient usage combinations of the pump 104, heat element(s) 106, and/or ambient conditions, as further described below, in order to provide for the water of the pool 116 to reach water temperature(s) as: maintained for a defined period for the target temperature (e.g. pool temperature of 25 Celsius for three hours); allowed to vary over time while still obtaining the target temperature for a defined time period (e.g. based on a pool 116 temperature of 18 Celsius at 9 AM to provide for reaching a target temperature of at least 25 Celsius between 3 PM and 6 PM); etc.

Pump 104

Figure 4:
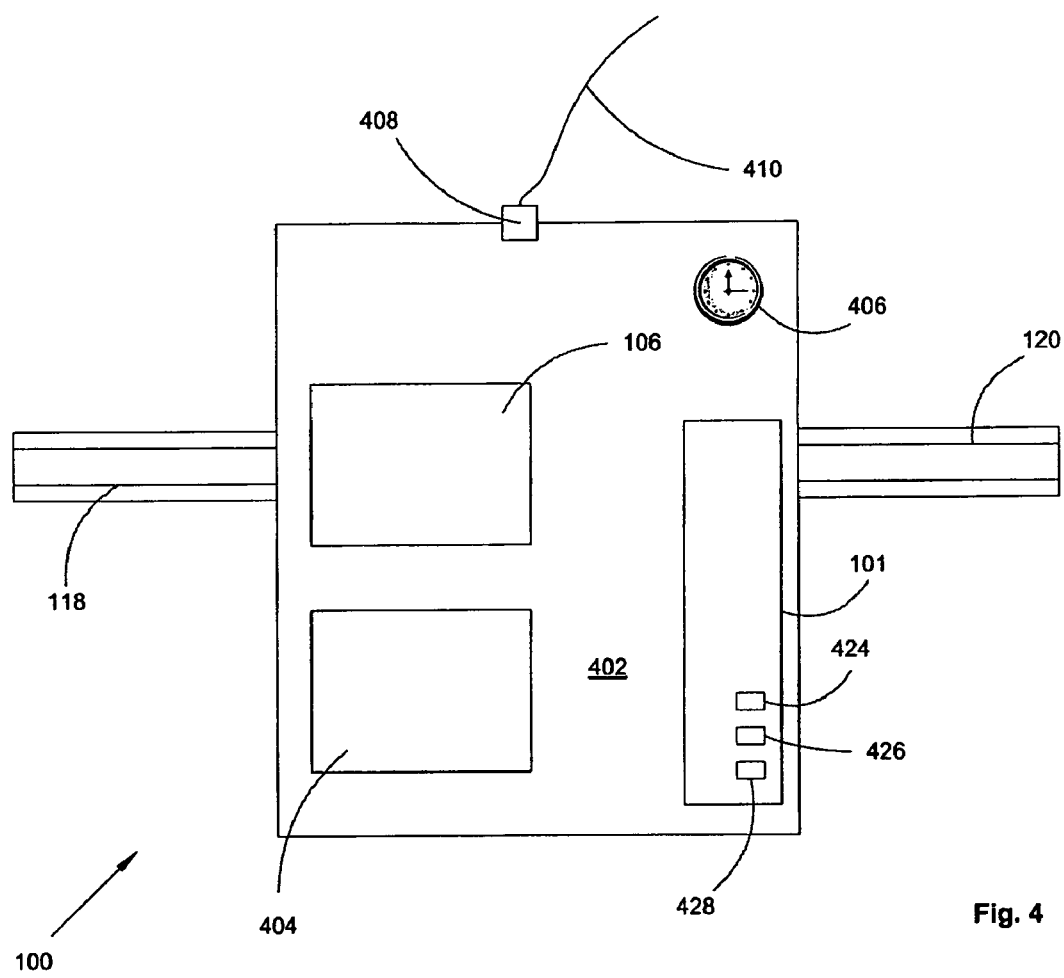
FIG. 4 is a block diagram of the circulation pump.

One embodiment of the circulation pump 104 is depicted in FIG. 4. The pump 104 is powered by a power source. The circulation pump 104 draws water from the pool 116 into an intake hose 118 and out of an outtake hose 120. The pump 104 preferably draws water into the intake hose 118 from the lower portion of the pool 116 and pumps it through the outtake hose 120 into the upper portion of the pool 116, thus creating a circulation of water in the pool 116. It is understood that the water may be circulated in alternative directions. As given, it is recognized that operation of the pump 104 (e.g. times such as off peak hrs, time duration, speed in the case of variable speed capabilities) is controlled by the controller 110, in order to account for proper circulation of the pool 116 water for pH and other water quality (e.g. filtering) considerations as well as for maintaining/reaching the desired target temperature.

Sensors 112

The sensors 112 are coupled to the device 100 for providing environmental information 706 (see FIG. 7) to the controller 110. Examples of the sensors 112 can include an air thermometer 110, or a thermistor 108 for measuring the temperature of the water in the pool 116 as well as measuring or otherwise giving an indication of the environmental conditions (e.g. air temperature, ground temperature, temperature forecasts, solar intensity, weather forecasts concerning amount of precipitation, etc). It is recognized that the sensors 112 can also include information on weather forecasting, i.e. predicted ambient conditions, that would be obtained from weather forecast sources (e.g. from the Internet or other network, manually or automatically and/or remotely input/entered via a user interface 202 by a user/owner of the pool 116, etc.).

Figure 3:
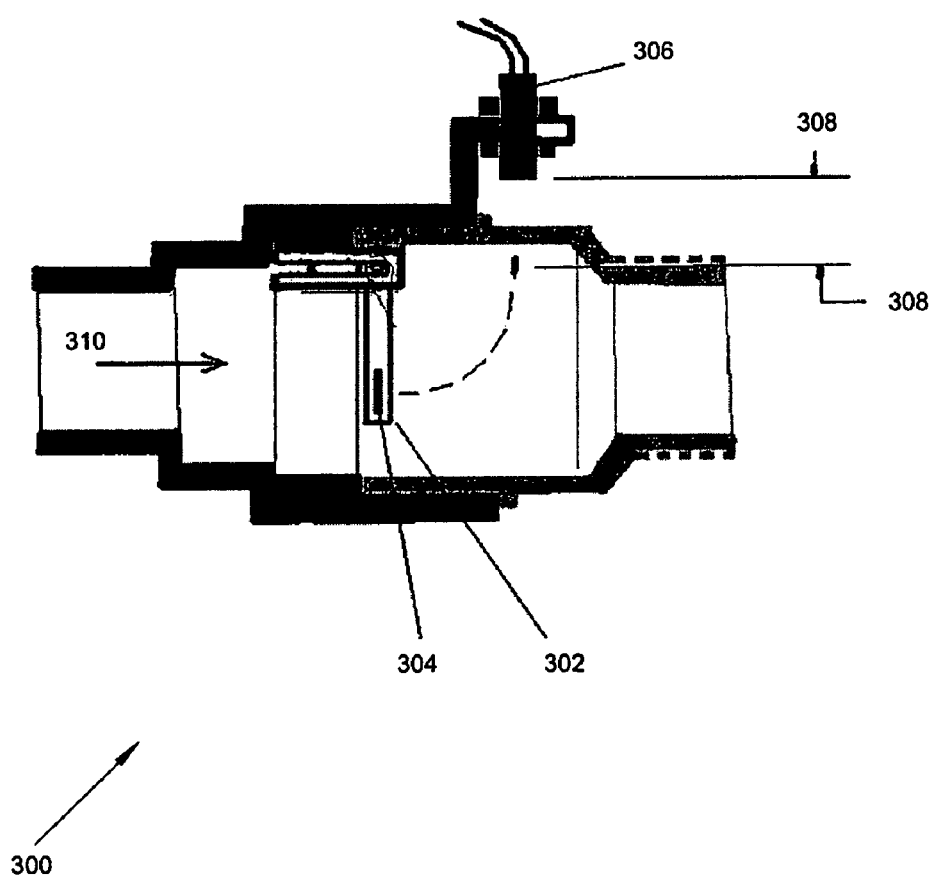
FIG. 3 is a cut-away diagram of the flow switch assembly.

Further, it is recognized that the sensors 112 can also be used to provide information to the controller 110 concerning operation of other components, such as but not limited to: positioning/status of the valves 111; operational status of the pump 104; water flow conditions as measured by a flow switch 300 (see FIG. 3); operational state of the heating element 106 (e.g. electrical heater is ok, gas heater is operating in normal operating parameters, air conditioning unit of residence(s) adjacent to the pool 116 is functioning—e.g. on vs. off); water level of the pool 116, etc.).

For example, the sensors 112 can be used to provide operational characteristics of the heat element(s) 106 to the controller 110, in order for the controller 110 to have knowledge of when and/or how much the heat element(s) 106 can be relied upon for use in adjusting the temperature of the pool 116 water. For example, the sensors 112 can be used to gather or otherwise receive information on the present/predicted usage characteristics of particular heating element(s) 106. One example of this would be a sensor 112 connected to a thermostat 507 of the residence 504 (see FIG. 5). In this case, the sensor 112 would be responsible for communicating with the controller 110 (e.g. via the interface 200) to provide an operating schedule for the air conditioning unit of the residence 504. In knowing this operation schedule of the air conditioning unit (e.g. time of day for on/off, set/programmed interior air temperature of the residence, historical usage of the air conditioner based on interior/exterior temperatures, etc.), the controller 110 can make decisions (timing and magnitude of heat required) for adjusting the water temperature of the pool 116 through using the air conditioner when actually available (i.e. availability of heat will be zero when the air conditioner is not operating).

In one embodiment the thermistor 108 is inserted into the incoming water flow to the pump 104 to read the water temperature. The electrical controller's 110 processor 208 (described below) can check this value repeatedly/periodically (e.g. hundreds of times each second). If the processor 208 senses that the temperature value being read from the thermistor 108 indicates the maximum temperature of the water (e.g. in the pool 116) has been reached, the controller 110 will decide to discontinue usage of the heat element 106 (e.g. shut off the A/C power to the heating element 106).

Further, for example the sensor can be a flow switch assembly 300 inserted into the water flow of the circulation pump 104. The flow switch 300 is shown in detail in FIG. 3, by example. Once water begins to flow (in the direction indicated 310), a flapper 302, or similar device holding a magnet 304 moves from a vertical position (as shown in FIG. 4) to a horizontal position in the water flow. This change in location is by design near a reed relay switch 306, which is magnetically activated. The switch 306 will be activated as long as the magnet is within the actuating range 308 of the switch. Once triggered, the switch 306 closes a circuit back to the processor 208. The controller 110 can be continually sensing a state change on this pin. When the pin goes high, indicating the relay 306 is closed and water is flowing, the controller 110 can allow the heating element(s) 106 to activate or otherwise be included in the water circulation circuit (e.g. via valves 111), in the event that the ambient conditions 706 are deemed by the controller as not sufficient to provide for the temperature of the pool 116 water in the set target temperature 702 (see FIG. 7) as provided in the schedule 108. However if the pin is low, it indicates the relay 306 is open and there is insufficient water flow present to allow efficient and/or safe use of the heating element 106. It is noted that there can be other independent safety features in place to protect the user and device from damage, and/or to facilitate efficient usage of the heating/cooling element 106 based on the detected flow (e.g. state and/or flow rate) of the water circulated by the pump 104.

Accordingly, it is recognized that the sensor(s) 112 can also supply information to the controller 110 that is in the immediate vicinity/environment of the pool 116, such as information concerning the operational status of heating and/or cooling systems (e.g. heat elements 106) of a residence adjacent to the pool 116. In this manner, the ambient/environmental sensors 112 can also be used to communicate operational information (present/predicted) of home heating/cooling elements 106 (e.g. an air conditioner, a central air unit, etc.).

Example Electrical Controller 110

The pool heating regulation device 100, also referred to as the pool temperature control device, could include without limitation the following features to help meet the pool 116 owner's expectations of being able to control the pool's 116 water temperature in view of energy efficiency considerations with respect to leveraging environmental conditions 706 and/or heat element(s) 106. It is recognized that the present disclosure is applicable for in-ground and aboveground pools 116, as well as for interior and exterior pools 116.

Figure 2:
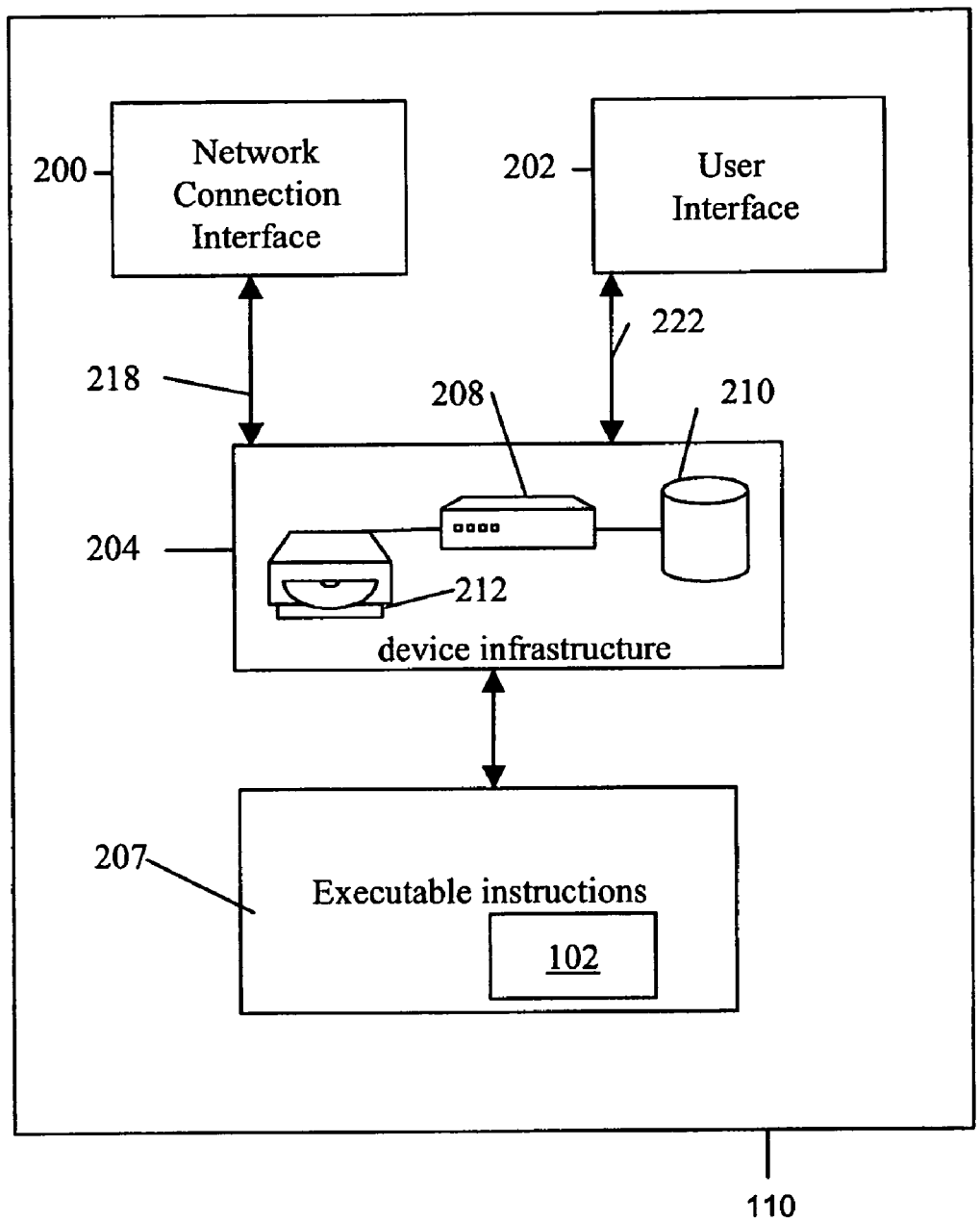
FIG. 2 is a block diagram of the electronic controller.

Referring to FIGS. 1 and 2, the controller 110 of the device 100 can be a computing device that can include a connection interface 200 coupled via connection 218 to a device infrastructure 204. The connection interface 200 is connectable to the hardware systems (e.g. sensors 112, switches, valves 111, etc.) of the device 110, which enables the computing device to control the water temperature, as appropriate for the setting in the schedule 108 in view of the ambient conditions and heating element(s) 106 capabilities. The device 110 can also have a user interface 202, coupled to the device infrastructure 204 by connection 222, to interact with a user (e.g. pool owner, weather information source, etc.). The user interface 202 can include one or more user input devices such as but not limited to a QWERTY keyboard, a keypad, a stylus, a mouse, a microphone and the user output device such as an LCD screen display and/or a speaker. If the screen were touch sensitive, then the display could also be used as the user input device as controlled by the device infrastructure 204.

Operation of the device 110 is facilitated by the device infrastructure 204. The device infrastructure 204 includes one or more computer processors 208 and can include an associated memory 210 (e.g. a random access memory). The computer processor 208 facilitates performance of the device 110 configured for the intended task associated with water temperature regulation through operation of the network interface 200, the user interface 202 and other application programs/hardware 207 of the device 110 by executing task related instructions. These task related instructions, including specification of the water temperature control parameters 102 for different degrees of pool usage for different ambient conditions. The implementation/determination of these instructions can be provided by an operating system, and/or software applications 207 located in the memory 210, and/or by operability that is configured into the electronic/digital circuitry of the processor(s) 208 designed to perform the specific task(s).

The network interface 200 (serial or wireless) may also be used to download new firmware to facilitate future software code upgrades as well as to provide and receive information about the environmental conditions (for example via sensors 112 or weather prediction settings) as well as for operational characteristics (e.g. current/predicted) for the various heat element(s) 106, as desired.

Further, it is recognized that the device infrastructure 204 can include a computer readable storage medium 212 coupled to the processor 208 for providing instructions to the processor 208 and/or to load/update the instructions 207. The computer readable medium 212 can include hardware and/or software such as, by way of example only, magnetic disks, magnetic tape, NVRAM, EEPROM, optically readable medium such as CD/DVD ROMS, and memory devices (SD Cards, USB devices, etc.). In each case, the computer readable medium 212 may take the form of a small disk, floppy diskette, cassette, hard disk drive, solid-state memory card, EEPROM, NVRAM, or RAM provided in the memory module 210. It should be noted that the above listed example computer readable mediums 212 can be used either alone or in combination.

Further, it is recognized that the device 110 can include the executable applications 207 comprising code or machine readable instructions for implementing predetermined functions or operations including those of an operating system and specification of the control process parameters 102, as well as any sensors 112 for communicating (via the interface 202) the state of the environmental conditions, for example. The processor 208 as used herein is a configured device or set of machine-readable instructions for performing operations as described by example above. As used herein, the processor 208 may comprise any one or combination of, hardware, firmware, or software. The processor 208 acts upon information by manipulating, analyzing, modifying, converting or transmitting information for use by an executable procedure or an information device, or by routing the information with respect to an output device. The processor 208 may use or comprise the capabilities of a controller or processor 208, for example. Accordingly, any of the functionality of the device and the associated process control parameters 102 may be implemented in hardware, software or a combination of both. Accordingly, the use of a processor 208 as a device or as a set of machine-readable instructions can be referred to generically as a processor, module or processor 208 for sake of simplicity. Further, it is recognized that the device 100 can include one or more of the computing devices 110 (comprising hardware or software) for implementing, as desired.

Example Controller 110

As described above, the electrical controller 110 provides a user interface 202 coupled to a processor 208 to automatically and intelligently facilitate the regulation of the pool's 116 temperature. The processors 208 can have several pins, which are connected to various devices that control the device's function (whether to read or write data, for example). By way of further example, one processor 208 has three pins, which are used to control the state of the three LEDS (RED—heater power, BLUE—Pump power, and GREEN—System power). The processor 208 may also have two further pins, which are used to control the two relays—one for switching the air conditioner 502 for the heater/cooler and/or switching water flow through the heater/cooler element 106 and another for switching the pump 104. The processor 208 may use several more pins to control the function of a timer IC (not shown) and to read and write data to the timer IC. As well, the processor 208 may use one pin to write serial data to an LCD display and another pin to read data from the thermistor 108 or other sensor(s) 112 (including the water's temperature for example) and yet another pin to read the state of the flow switch 300 (such as water movement measurements). The processor 208 may use four more pins to read the state of several buttons on the user interface 202 used to receive user input. Another pin could be used to read the external temperature of the ambient conditions 706. An isolation transformer may be used to reduce electromagnetic interference (EMI) on the A/C line in order to provide clean A/C voltage for use in the controller. An A/C to DC converter changes A/C voltage into DC voltage at the correct levels. Each processor 208 receives DC power via the output of a second stage voltage regulator, which is fed by DC power. The output of the second stage DC regulator is also used to power the remainder of the electrical controller 110. Further, discrete components may be used to regulate current, voltage, and dissipate noise.

The processor 208 may also control three LEDs that indicate the state of the powered devices. For example, the Red LED may indicate that the heating element 106 is active. The Blue LED may indicate that the pool pump 104 is active. The Green LED may indicate that system power is present.

In one embodiment, the electrical controller 110 may have a single, integrated board that manages the voltages and their external connections, the buttons, the interface for the thermistor 108, flow switch 300 and display, a processor and its crystal and external serial interface, the timer IC, LEDs, and a battery to help protect against data loss in the event of an unplanned power loss).

A program running on one of the electrical controller's 110 processors 208 may provide safety features and functional control. For example, the software and hardware is divided into several code banks or separate and independent programs: Initialization, Main, Setup Time and Date, Manual Pump and Heater Control, 24 Hour control and/or 5/2 Day Control as per the schedule 109, Temperature settings of the schedule 109, and Flow Control. Each code bank can be unaware that the other exists and can run independently. Segments can communicate by reading and writing their results to the Timer IC's scratch pad RAM. For example, when the program flow transfers to the Temperature and Flow Control program segment, the processor 208 runs that code sensing the current water temperature and state of water flow. It stores this data into pre-defined locations in the Timer IC's scratchpad RAM. Program flow is then transferred back to the Main program segment, which reads the Timer IC's pre-defined locations to obtain the current state of the water flow and water temperature of the pool 116. In the same fashion, program states are read and stored, target temperatures 702 are read and stored, and start and stop times are read and stored for the various user settings and programs as defined in the schedule 109. The user's data is stored into the Timer IC since it is a battery backed up IC, which retains its settings regardless of A/C power presence. In this way, all user settings are preserved in the event of temporary A/C power loss.

Additionally, the controller 110 can be configured to use an anti-chatter function. This function uses the principal of hysteresis to inhibit the controller 110 from switching the heating/cooling element 106 on and off frequently as it hovers about the target temperature. To help accomplish this, the controller 110 disconnects the heating/cooling element 106 temporarily once it achieves the target temperature 702, or if the heating/cooling element 106 is not needed during use of the environmental conditions 706 for water regulation purposes. At this point the controller 110 changes state and will not turn on/utilize the heating/cooling element 106 until the element 106 is deemed necessary to regulate the water temperature, for example when the temperature drops a pre-determined amount (say 0.6 C) before claiming the temperature is too low. This small temperature difference created by using the hysteresis principal takes time to occur (as this reflects the pool's temperature) and prevents the heating element 106 relay from "flickering" as it hovers about the target temperature 702. A processor 208 in the controller 110 is checking the temperature hundreds of times per second (for example) and if the software senses that the temperature is too low one millisecond and too high the next millisecond, it will turn the relay, controlling the heating element, on and off hundreds of times per second creating a chattering effect. Hysteresis can help prevent the chattering effect. The temperature differential, although very small, will take a long time relative to the processor 208 to change, thus making the relay switching far less often to help extend the life of the mechanical switch and expensive heating element.

Figure 6:
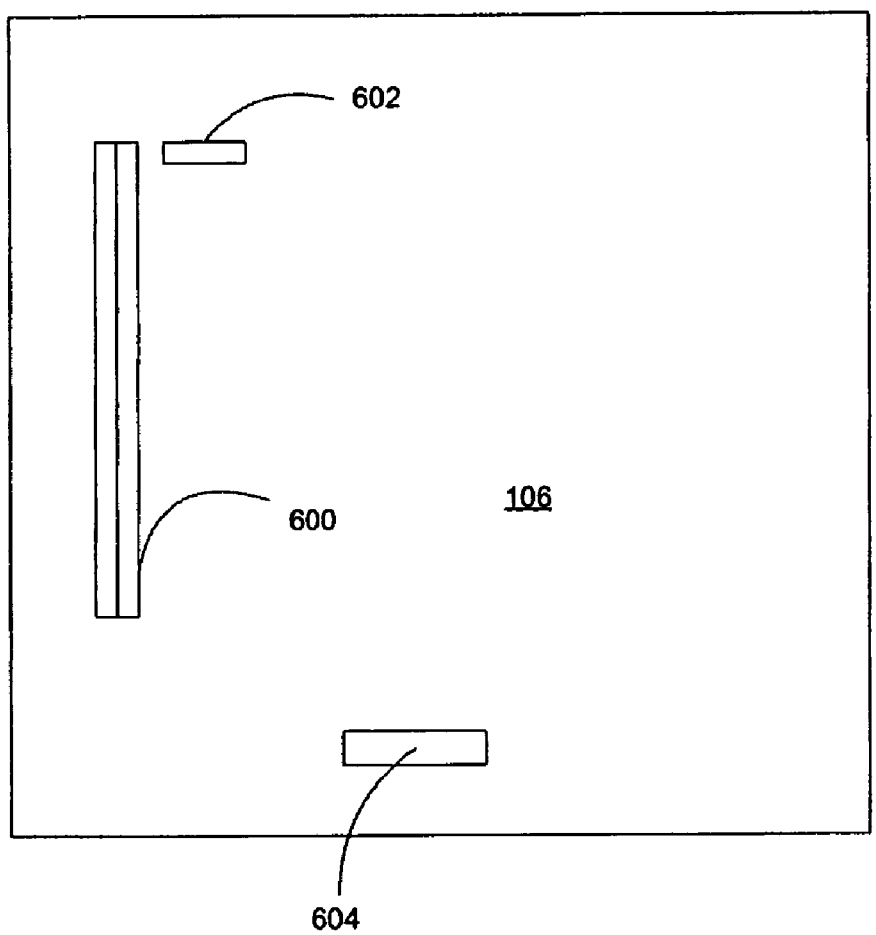
FIG. 6 is a block diagram of a mechanical shut-off switch in the heating element.

One embodiment may also include a mechanical shutoff switch 602, depicted in FIG. 6, built into the heating element 106. It can be based on a bimetallic strip 600, which expands at a known rate relative to the temperature. The strip is calibrated to activate a relay switch 602 at a maximum safe cut-off temperature. The switch 602 will shut off the A/C to the element independent of the processor 208 systems activities. As well, it can re-enable the heating element 106 power once the temperature reaches a safe level or await a user to activate a manual reset button (described below).

The user interface 202 may also include a menu function. A reset function or button, which clears all user settings returning the controller 110 to the beginning state, may be included on the menu.

A manual reset button 424 (see FIG. 4) may be included on the controller 110. When activated, this reset button 424 reboots the processor 208 and re-launches the program, similar to rebooting a personal computer using the power on/off button while the computer is running. Since all user data is preserved on the Timer IC's battery backed up RAM, rebooting the electric controller's 110 processor(s) 208 will simply restart the last program that was running prior to the reset using the stored user settings. This can be useful if the processor ever enters an unplanned state.

A manual heater on/off button 426 (see FIG. 4) may also be included on the controller 110. When the button 426 is pressed the controller 110 activates the heating element 106 and pool pump 104 overriding any subsequently active program, thereby increasing the pool's 116 temperature. Unlike a home heating system where a target temperature is always set, this function can be unbounded until it reaches the maximum safe temperature.

Power Sources

In North America a 3-phase power system is used. As this application can be intended for residential use, for example, the focus below is on how this application can integrate into that power system. There are two example cases that this device 100 has been developed for:

First is when available power is 15A at 120V. In this case, an above ground pool pump 104 draws up to 1.5 A at 120V. This leaves 11.5 A for the pool heater 106 after applying a de-rater of 20% based on the North American electrical code.

Second is when available power is 30A at 240V. In this case, a pool pump 104 draws 0.75 A at 240V. This leaves 23.25 A for the pool heater 106 after applying a de-rater of 20% based on the North American electrical code. 23.25 A at 240V can generate 5580 Watts. A heater 106 with this power can generate over 1000 calories of heat each second. It is recognized that in order to achieve 30A at 240 V special cabling and plugs can be present with two live phases, and ground, as is known to those skilled in the science.

A heat exchange device 106 may be used to capture the discarded heat from the compressed refrigerant of an air conditioner and the cool pool 116 water may be used to cool the refrigerant, as described below. This implementation offers the user significantly reduced heating costs as the energy of the air conditioner 106 is a sunk cost which is the majority of the heating cost. Additionally, the air conditioner's effectiveness will improve with larger heat differentials because colder water from the pool 116 will be used to cool the refrigerant via the heat exchanger 106. In any event, it Is recognized that usage of the air conditioner heat exchanger 106 is useful when the air conditioner is running (i.e. operating) and as such it is preferable that the controller 110 have knowledge (e.g. via sensors 112) of the operational state of the air conditioner. For example, the controller 110 may be configured to direct the thermostat 507 of the residence 504 (see FIG. 5) to continue or otherwise adjust the operation of the air conditioner until the controller 110 communicates the decision that the heat obtained/delivered to the heat exchanger 106 of the air conditioner from the pool 116 water is no longer required.

The controller 110 can be contained within a housing 402, as shown in FIG. 4. The housing 402 is an enclosure, which can meet all electrical and outdoor requirements for consumer use. Along with the electrical controller 110, the housing 402 may provide a foundation to hold the heating element 106 and a display 404 (e.g. the user interface 202); the housing may provide an interface 408 for the electrical power (e.g. to connect a power cord 410); the housing may connect the intake 118 and outlet 120 pool 116 water hoses in the case where the heater element 106 and/or the pump 104 are contained or are otherwise coupled to the housing 402; and, the housing 402 may protect the device's 100 inner workings from external conditions (water, air, dust, etc.) and from the user (e.g. shock hazard).

Schedule 109

The controller 110 can be programmed allowing the user the ability to set desirable heating patterns (as described below), such as: 24 hour Timer, 5/2 Day Timer, Manual On/Off, and other pool 116 usage and ambient condition 706 considerations through the definitions of the temperature/timing parameters 102 in the schedule 109.

The schedule 109 is used by the controller 110 in order to have knowledge of a number of control parameters 102 that effect the operation of the heat element(s) 106, usage of the environmental conditions 706 (see FIG. 7) for the heat sources, and/or operation of the pump 104. The control parameters 102 that are in the schedule 108 are parameters such as but not limited to: target temperature 702 for a set period of time(s) (e.g. for a particular day, group of days, weeks, season, etc.); an allowed temperature range for the target temperature 702 (e.g. ±0.2 Celsius of the target temperature 702); times or periods of time that regulation of the pool 116 temperature is not required/desired (e.g. at night when the pool is not in use); target temperature 702 for an indefinite period of time (e.g. 25 Celsius constant day/night); desired operation of the pump 104 to affect mechanical water properties (e.g. filtering of contaminants, regulation of pH, etc.) of the pool 116 water; desired daily time periods for pool 116 usage; etc.

Based on the schedule 109 information (e.g. the contained parameters 102), the controller 110 makes decisions on when the pump 104 should be turned on/off and when/if the environmental conditions 706 and/or the heat element(s) 106 should be used to adjust the water temperature of the pool 116 to the desired target, temperature 702 (e.g. for the appropriate time).

It is recognized that the information contained in the schedule 109 can also include information on the operations characteristics (e.g. actual/predicted) of the various heating element(s) 106 available for use in adjusting the water temperature, for example as collected from the sensors 112 coupled to the various heat element(s) 106.

Example Schedule

The following example schedule 109 can be used to by the controller 110 to make decisions on when/if to use environmental conditions 706 and/or one or more heat element(s) 106 to reach/maintain the target temperature 702 for the associated time period.

The controller 110 may also have a twenty-four hour timer program (e.g. schedule 109) that allows a user to set three conditions (start time, stop time, and target temperature) whereby the device 100 will monitor the use of environmental conditions 706 throughout the specified daily timeframe and apply heat element(s) 106 or other means to heat the pool when the target temperature is below the pool's 116 temperature, for example. The conditions can be the start hour, stop hour and target temperature 702 for the pool 116. The controller 110 will turn on the pool pump 104 at the start hour and will measure the pool's 116 water temperature. The pool's 116 water temperature is the temperature measured using a thermistor 108 in the flow of water coming from the pool 116 driven by the circulation pump 104. If the temperature of this intake flow is less than the target temperature 702, the controller 110 makes a decision as to use the environmental conditions 706 and/or the heat element(s) 106 to adjust the water temperature in order to reach the target temperature 702 by the desired time, as available in the schedule 109. If the measured temperature achieves the target temperature 702, but the stop hour has not been reached, the controllers processor 208 may disable any heating element(s) 106 in use but keep the pool pump 104 on. If the stop hour has been reached, the processor 208 can turn any utilized heating element(s) 106 off and the pool pump 104 off.

The program of the controller 110 can continually regulate the pool's 116 temperature about the target temperature 702 by sensing the pool's temperature many times per second and then will control the operation of the heating element 106 to heat the pool if required during the specified time frame if absent of the availability of environmental conditions 706 for use in adjusting the pool 116 temperature. It is recognized that a clock/timer 406 can be connected to the device 100 in association with operation of the schedule 109.

One embodiment of the present device includes a 5/2-day timer program (not shown). The 5/2-day timer program is an extension of the twenty-four hour timer program. Using the 5/2-day timer program, a user may set a start time, a stop time and a target temperature 702 (or range of temperatures) that runs as per the twenty-four hour timer program during the weekdays (Monday-Friday) and another potentially different group of settings (start time, stop time, target temperature) that runs during the weekend (Saturday-Sunday). Based on these settings and available sensor 112 information, the controller 110 can rely upon the environmental conditions 706 (with or without associated operation of the pump 104) and/or the heat element(s) 106 in a scheduled manner in order to reach the set target temperature 702 by the set time/time period.

A user can set the start hour (based on a 24 hour system) for both the weekday and weekend followed by the stop hour (based on a 24 hour system) for both the weekday and weekend and a desired pool 116 target temperature 702(e.g. degrees Centigrade) for both the weekdays and weekend. The controller 110 can automatically turn on the pool pump 104 at the start hour (as set during the weekday or weekend) and measure the pool's 116 temperature. The temperature is the temperature measured using a thermistor 108, for example, in the flow of water coming from the pool 116 driven by the circulation pump 104. If the temperature of this intake flow is less than the target temperature the controller 101 will apply the heating element 106 to heat the pool if required during the specified time frame if absent of the availability of environmental conditions, 706 for use in adjusting the pool 116 temperature. If the temperature achieves the target temperature, but the stop hour has not been reached, the processor 208 will turn the heating element 106 off, for example, but may keep the pool pump 104 on. If the stop hour has been reached, the processor will turn the heating element 106 and pool pump 104 off. The program will continually regulate the pool's 116 temperature about the target temperature by sensing the pool's ambient temperature many times per second and then control the power to the heating element 106 to heat the pool and/or will employ the use of environmental conditions 706 for use in adjusting the pool 116 temperature if required during the specified time frame(s). This process is repeated during the weekdays and then for the weekends using the appropriate setting groups.

Further, the controller 101 may also have a power off program (not shown). This program allows a user to turn the device 100 off, overriding any active program. The device 100 will not recover from this state unless the user activates a new program or re-activates a previously set program.

Example Operation

In the below examples, it is recognized that the controller 110 makes decisions on how to best utilize the resources of the environmental conditions 706 and/or the heat element(s) 106 to adjust the water temperature of the pool 116 in order to meet the set temperature target 702 requirements as defined in the schedule 109. It is recognized that the controller 110 also has knowledge of various heat exchange characteristics/efficiencies (e.g. the amount/magnitude of available heat from/to a particular heat element 106 for a specified water flow rate and water temperature) as well as the amount of heat transferable to/from the pool 116 water when relying upon environmental conditions 706 (e.g. heat to/from adjacent air, ground, solar radiation, incident precipitation, etc.). In order to make the associated heat transfer calculations, the controller 110 could have heat transfer formulas stored in memory 210 (see FIG. 2) that would be representative of the practical/actual heat exchange characteristics/efficiencies of the various heat sources/sinks pertaining to the environmental conditions 706 information as well as the various heat element(s) 106.

In operation, the circulation pump 104 can assist in modulating the amount of heated (or cooled) water presented to the pool's 116 outer surfaces (exposed surface water and outer walls) creating a temperature differential, thereby assisting in controlling the temperature of the water through measured/calculated circulation-enabled heat gain or heat loss. The premise being that it can be warmer in the daytime periods and cooler in the evening periods.

For example, if the pool 116 is too warm, the user can circulate the warm water during the night (using the pump 104) creating increased exposure of the warm water with the cooler outer surfaces and therefore increasing a negative heat differential (heat loss), thereby cooling the pool 116 water.

Conversely, the user can run the circulation pump 104 during the day moving the cooler pool 116 water against the pool's warmer outer surfaces where the temperature differential helps to create a positive heat differential (heat gain), thereby heating the pool water.

As discussed above, the sensors 112 measure environmental conditions, such as degree of precipitation, solar intensity, air temperature, ground temperature, etc., and the water temperature of the pool 116. It is recognized that either actual measurements and/or predicted and/or anticipated measurements from the sensors 112 are taken and used in heat transfer calculations by the processor 208 (using methods known to those skilled in the science). These measurements are used to determine if circulation of the pool 116 water, via the pump 104, will facilitate changing of the water temperature at an appropriate rate towards the desired/set water temperature (or temperature range) defined in the schedule 109. The volume of water in the pool 116 may also be input into the memory 210 through a user interface 202 or measured (either determined statically or dynamically) as a reflection of the amount of energy needed to raise/lower the water temperature of the pool 116 per degree.

Further, a user may enter the target temperature 702 into memory 210 through the user interface 202. The target temperature 702 represents the desired temperature of the pool 116 water. Additionally the target temperature 702 may be associated in memory 210 with specific time periods by the user supplying such information through a user interface 202.

The circulation pump 104 associated with the pool temperature control device 100 can be temperature control driven to regulate the circulation effect to achieve optimal user temperature as specified in the schedule 109, in view of the calculated/determined/known availability of direct sunlight for heating and cool environments (e.g. nights or cloudy/windy days) for cooling of the pool 116, as well as measurements other environmental conditions 706, as well as those known operational characteristics/scheduling of the heat elements(s) 106. The device 100 is used to regulate the temperature of the pool 116 via these parameters when available.

The circulation pump 104 can be of variable speed and powerful enough to generate sufficient circulation of pool 116 water to optimize the heating or cooling effect. For example, the if the temperature of the pool's 116 water is below that of the air temperature (as measured by the thermometer 110 attached to the controller 110) and if the temperature of the pool's 116 water is also below the target temperature 702, then the controller 101 may activate the circulation pump 104 to circulate the water from the bottom of the pool 116 towards the pool's 116 above-ground surfaces (top surface and outer walls) and vice versa. This will heat up the pool 116 water through exchanging heat at the pool's 116 surfaces (directly or indirectly) with the surrounding air (e.g. environmental conditions 706). The heated water will then be circulated to the lower part of the pool 116 allowing cooler water to circulate to the surface of the pool 116 where the cooler water will similarly be heated. Similarly, the heating element 106 may be activated (independently of the pump 104 for example) to provide additional heat to the pool 116 water. The heating element 106 may be immersed in the pool 116 water directly or, alternatively, the heating element may be inside the intake hose 118 or outlet hose 120 of the pump to heat the water as it travels through the pump 104 when the pump 104 is in operation.

These target temperatures 702 can also take Into account the actual or planned usage of the pool 116, as defined in the schedule 109. For example a user may only want the pool 116 to be heated during weekend hours or during the daytime. The circulation pump 104 may not operate when the user does not want the pool heated, thus allowing the pool 116 temperature to intentionally stray outside of the target temperature 702 when not in use, thus conserving man made energy. The target temperature 702 can be a specific temperature or a range of temperatures. The pool temperature control device 100 can be configured to wait for desired environmental conditions (as measured by the sensors 112) to present themselves before operating the pump 104 to circulate the water. For example, this feature would allow for the pool 116 water to remain cooler than the target temperature 702, with the pump 104 off, until the predicted beneficial environmental conditions 706 are reached, such as noontime or afternoon sunny conditions as compared to morning time shade conditions, recognizing that it is still able to reach the target temperature 702 using the heating element 106 in the required time frame by waiting for the arrival of environmental conditions 706. In this way, the control device 100 can minimize the use of man-made energy in achieving the user-defined heating objectives. In any event, it is recognized that the pool temperature control device 100 can be configured to take advantage of the environmental conditions 706 in order to help minimize usage of a heating or cooling element 106 (and subsequently minimize use of man-made energy & associated costs) to control the pool 116 water temperature.

A desired target temperature 702 (or range of temperatures) can be set on the device 100 through the user interface 202. The controller 110 will then automatically regulate the temperature by operating the pump 104 and/or the heating element 106 at the appropriate time. By way of further example, if the target temperature 702 is higher than the air temperature (e.g. sensed/known/predicted environmental conditions 706), the circulation pump 104 may be activated after the hot period has passed, preserving the cooler water at the bottom of the pool, and later circulate this cooler water to the warmer surface thereby lowering the pool 116 temperature. This allows the pool 116 water to take advantage of the heat differential between the surface of the pool 116 and the surrounding air, thus lowering the pool 116 temperature. The controller 110 can have a clock or timer 406, which can be leveraged to facilitate desirable temperature regulating programs according to the schedule 109. For example a user may provide certain times of the day (in the evening for example) when he or she may wish to use the pool 116. This time period may be entered into the memory 210 of the controller 110 (embodied in the schedule 109), and the controller 110 may then operate the pump 104 or heating element 106 during and/or before the scheduled time period in order to achieve the target temperature 702 in the pool 116 for the specified time/time period.

Figure 7:
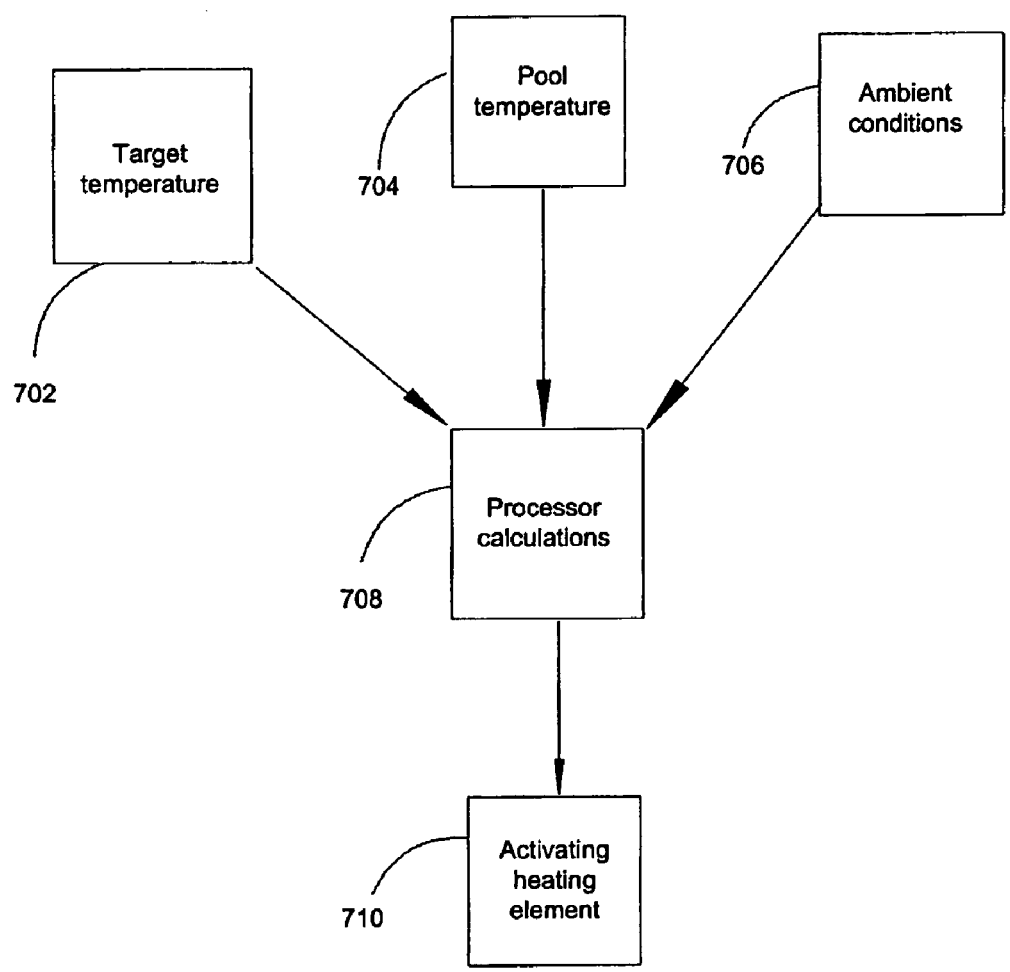
FIG. 7 is a flowchart of depicting the operation of the controller.

The general operation of the pool temperature controller 101 is depicted in the flowchart in FIG. 7. First, the controller 110 receives the target temperature 702 of the pool 116 water, the user information 704 (such as the target temperature range, the time of day, sensor 112 readings, etc.), and environmental condition information 706 (such as the air temperature, the solar intensity, precipitation measurements, the calendar date etc.). Within the processor 208 of the controller 110, calculations are undertaken 708 to determine whether it to activate the heating element 106 (and/or the circulation pump 104, for example), and/or one or more of the heat element(s) 106, in order for the pool 116 temperature to reach the target temperature 702. Such calculations are described in detail below, but may include activating the heating element 106 only when the environmental conditions 706 are not sufficient to heat the temperature of the pool 116 water to within the target temperature range 702 by the appropriate time defined in the schedule 109. Depending on the calculations of the processor 208 the heating element 106 and/or the environmental conditions 706 may be utilized 710 by the controller 110 for heating/cooling the water in the pool 116.

The controller 110 can separately control the pool 116 pump 104 and the pool heater/cooler elements 106. Typically, the pool 116 water is circulated daily for several hours to provide dispersion of pool chemicals, including chlorine which reduces algae growth, and create desirable temperature differentials for heating or cooling purposes with the pool 116 water's outer surfaces (e.g. top, bottom, or sides). It is recognized that environmental conditions 706 can be sensed or otherwise approximated, anticipated, or predicted for any of the environmental conditions (e.g. air, ground, or solar intensity) adjacent to or otherwise affecting the respective pool surface (top, sides, bottom). Tying the pool heater 106 operation to the pool pump 104 may conflict with these objectives, i.e., that the target temperature 702 may have been achieved, but the daily circulation time was not met implying that that the pool pump 104 should be on and the pool heater/cooler 106 should be operated so as to not fail in reaching/maintaining the water temperature of the pool 116. In this case, the controller 110 can be configured to operate the pump 104 in view of the environmental conditions 706 that affect the actual water temperature, the set water temperature, pool 116 usage timing considerations, pool chemical/filtering considerations, or available heating/cooling capabilities of an artificial heating/cooling element 106 (e.g. requiring power/energy input/output and water flow through to operate).

The heating source 106 may be implemented as an electrical device such as an electrically powered circulation element. Alternatively a thermometer 110, which measures the outdoor temperature, could be used together with the thermistor 108, which measures the water temperature. In this implementation, if the sensed or predicted outdoor temperature is warmer than the water temperature, and the pool 116 is below its target temperature, the device 100 could activate the pool pump 104 alone. This decision could also be made on the potential solar heating or cooling opportunity (e.g. anticipated or measured solar intensity) or considering a number of factors including the air-to-water heat differential, the actual-to-target water temperature differential, and time of day. As mentioned earlier, running the pool pump 104 to circulate the water in the pool 116 forces the water against the pool's outer surface area exposing the water to the warmer or cooler pool surfaces (which is warmed or cooled, respectively, by the air), thereby creating a beneficial heating or cooling effect on the pool's 116 temperature. Running the pool pump 104 alone can be a significantly lower electrical load (and cost) than using the pool pump 104 in combination with the heating/cooling element 106 (e.g. a heat pump) to regulate the water temperature.

This approach can effectively optimize the solar heating effect and other environmental heating or cooling effects. Conversely, if the pool 116 is too warm (in relation to the target temperature), the program can work in reverse. When the outer air is cooler than the water (or the water is in the shade), and the goal is to reduce the pool's 116 temperature (i.e. if the pool's water temperature is higher than the target temperature), the program can activate the pool pump 104 forcing the warmer water against the cooler outer surface areas (which are cooled by the cooler air) of the pool 116 creating a negative heating effect, thereby cooling the pool. Again, running the pool pump 104 by itself can be less expensive than operating the pool pump 104 and heating/cooling element 106 in combination, and doing so can utilize the natural environment to regulate or otherwise help regulate the pool's 116 water temperature. The logic of taking advantage of the external temperature (e.g. or other environmental conditions 706) to make heating decisions is not one that is Included in a home heating system.

In addition, taking this approach a step further, the pool controller 110 could make even more advanced decisions whereby it recognizes its heating or cooling capabilities and may decide not to heat or cool the pool 116 in extreme conditions where the temperature changes significantly. In this scenario, the device 100 would wait-out the extreme temperature change and then re-double its efforts (using air temperature considerations together with potentially one or more heating element(s) 106) to restore or shed the heat rather than needlessly waste electricity/energy trying to reach the pool's 116 temperature goal in an environment where it may not reach its thermal objective efficiently.

For example, a user could provide the memory 210 with a maximum (or minimum) temperature through the user interface 202. If the temperature of the pool 116 water was above the provided maximum temperature (or below the provided minimum temperature) the controller 110 may automatically cease operation of the pump 104 and the heating element 106. By way of further example, the controller 110 may have pre-programmed internal maximum or minimum temperatures beyond which the controller 110 will cease operating the pump 104 and heating element 106.

The above-described features can be considered a green philosophy that has consideration for the environment and saving energy or otherwise helping to minimize energy usage. Further, it is recognized that the controller 110 can also be configured to indicate or to otherwise automatically control the use of a pool cover (not shown) to assist in maintaining the water's target temperature 702. For example, if the controller 110 determines that based on anticipated or actual weather conditions that the pool cover (not shown) usage would achieve the desired pool 116 temperature without the need for use of the heating/cooling element 106, this could be indicated to the user or pool owner (e.g. through a message on the user interface 202) or otherwise done automatically. The use of the pool cover could also be considered in view of pool 116 usage (i.e. people in the pool). Further, it is recognized that time is a factor that is part of the calculation used by the controller 110 in deciding how the pool 116 water temperature should be regulated at any given point in time. For example, if pool 116 usage (e.g. not in use) indicates that sufficient time is available for temperature regulation using environmental conditions 706 only, then the controller 110 would operate the pump 104 appropriately while keeping the heating/cooling element 1.06 turned off (or otherwise isolated from the circulated water of the pool 116).

Example Multi-Stage Operation

In a further embodiment, the controller 110 could use a multi-step operation to control the temperature of the pool 116 water, wherein a first stage of the operation would be decided as using the environmental conditions 706 for contributing a portion of the total amount heat transfer/exchange needed for the pool 116 water to reach the target temperature 702, for example when sufficient solar intensity is available, when ambient air temperature is greater than the pool 116 water temperature when heating is desired, when ambient air temperature is less than the pool 116 water temperature when cooling is desired, when ambient ground temperature is greater than the pool 116 water temperature when heating is desired, when ambient ground temperature is less than the pool 116 water temperature when cooling is desired, etc.

Once the environmental conditions 706 are deemed by the controller 110 as no longer suitable for reaching/maintaining the desired target temperature 702 (e.g. air temperature is at or lower than the pool 116 temperature, sun intensity is below a certain threshold, etc.), the second stage of the operation could be used by the controller 110 to activate one or more available heat element(s) 106 to contribute an additional portion of the total amount heat transfer/exchange needed for the pool 116 water to reach the target temperature 702. For example when the air conditioner or heat pump is available for use as the heat element 106, use of the electrical/gas powered heat element 106, and/or other available heat element(s) 106. If the environmental conditions 706 are subsequently deemed to be appropriate to help the controller 110 reach or maintain the target temperature 702, the controller 110 could disable one or more of the heat element(s) 106 in use and then rely upon the environmental conditions 706 to contribute the next (potentially the final) portion of the total amount heat transfer/exchange needed for the pool 116 water to reach the target temperature 702.

It is recognized, given the above, that the controller 110 could use a plurality of different stages to contribute portions of the total amount heat transfer/exchange needed for the pool 116 water to reach the target temperature 702, simultaneously and/or sequentially. For example, the stages can be stage combinations such as but not limited to: use of environmental conditions 706 followed by use of one or more heat element(s) 106; use of one or more heat element(s) 106 which is/are then disabled and followed by use of environmental conditions 706; simultaneous use of environmental conditions 706 and one or more heat element(s) 106; use of environmental conditions only; simultaneous use of a plurality of heat elements 106; use of a selected heat element 106; switching between selected heat elements 106 and thereby disabling those elements not selected and enabling those elements selected; subtracting or otherwise disabling selected heat element(s) 106 from a group of heat elements 106 currently in use; adding or otherwise enabling selected heat element(s) 106 to one or more heat elements 106 currently in use; subtracting or otherwise disabling selected heat element(s) 106 from a group of heat elements 106 currently in use; or a combination thereof.

Figure 8:
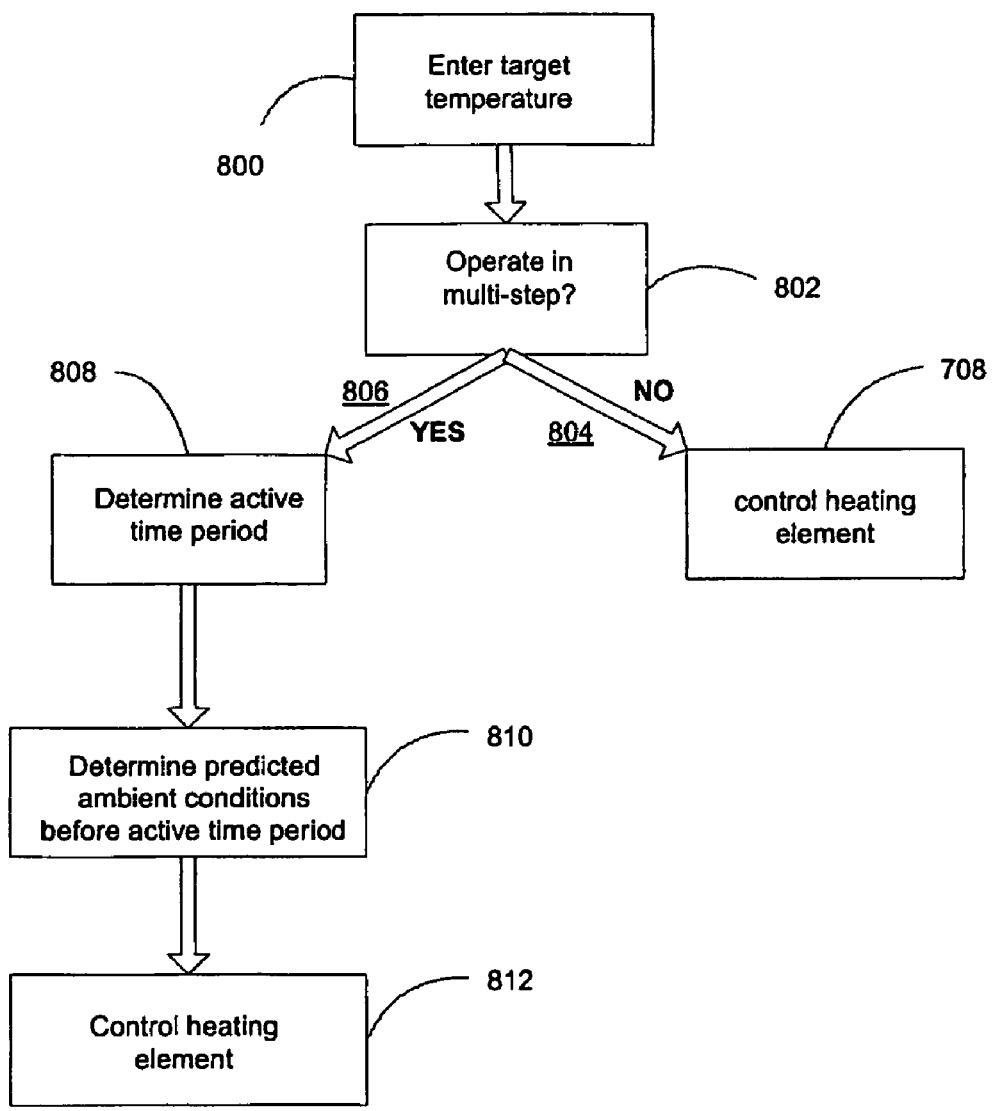
FIG. 8 shows a flowchart of a multi-stage operation of the controller of FIG. 1.

For example, a user could indicate through the user interface 202 (see FIG. 3) that a selected multi-step operation be employed. When employing the multi-step operation, the controller 110 can take as input the time of day, the current environmental conditions (as determined by the sensors 112), predicted environmental conditions (also determined by the sensors 112 and the controller 110) and the time periods of expected use. Using that input the controller 110 could then control the operation of the heating element 106 according to an example multi-step procedure, which is shown in FIG. 8.

A user selects a target temperature 800 and the controller 110 chooses whether to operate in multi-step mode or not 802, based on available sensor 112 information. If the multi-step mode is not chosen 804 then the controller 110 operates the selected heat source (e.g. environmental conditions 706, one or more heat element(s) 106, or the combination thereof) consistently until reaching the target temperature for the target time of use, and/or to maintain the reached target temperature 702, as described above. However, if the multi-step mode is chosen 806 then the controller 110 cycles through the various stages by sequentially selecting and/or deselecting from an initial heat source (environmental conditions 706, one or more heat element(s) 106, or the combination thereof) until reaching the target temperature for the target time of use, and/or to maintain the reached target temperature 702, as described above.

It is recognized that there may be more than one active time period. For example, the controller 110 may automatically shut off the heating element 106 if the predicted environmental conditions 706 are such that they can be expected to supply the remaining heat needed to heat up the pool 116 to the target temperature 702 (or target temperature range) without additional heat needed from the heat element(s) 106.

Later in the day, for example, if the environmental conditions are such that the pool's 116 water temperature is expected to fall below the target temperature 702 (or outside of the target temperature range) then the controller 110 can operate the heat element(s) 110 to adjust the pool's 116 water temperature to be back within the target temperature 702 (or target temperature range).

Safety Features

The device 100 may have multiple safety features to power off the heating element 106 should it exceed its maximum temperature regardless of the program state. These safety devices could be managed using different mechanisms—electronic and mechanical, and use independent thermostats.

In one embodiment of the device, the heating/cooling element 106 and the pool pump 104 will automatically switch off when the temperature of the pool 116 water entering the device 100 reaches the maximum safe temperature (as measured by the thermistor 108). The maximum safe temperature value may be embedded into the main software routine of the electric controller's processor 208 and may be executed several hundred times per second.

Further, the heating/cooling element 106 and the pool pump 104 may also automatically switch off when the heating elements 106 built-in mechanical thermostat 604 reaches its maximum safe temperature. This maximum safe temperature value may be embedded into the main software routine of the electric controller's processor 208 and may be executed several hundred times per second. This function may be provided by an independent system, which once activated (i.e. when the maximum safe temperature is reached), will interrupt the power to the heating element 106.

In another embodiment, the heating/cooling element 106 and the pool pump 104 may also automatically switch off when insufficient water flow occurs. This is detected via a flow switch 300, which monitors the flow rate of water passing through the heating element 106. The state change of the flow switch 300 is monitored by the processor 208. Once the processor 208 senses the state change (open for insufficient water flow), it will open the relay to the heating element 106 removing power from it.

A further independent safety feature is the use of current collectors (not shown). Current collectors are installed at both the inlet 118 and outlet 120 (see FIG. 1) of the water flow from the device 100 and connected directly to ground leading back to a circuit panel. In the event of a heater malfunction which results in the metal heater element 106 and/or chassis becoming charged, the current collectors would safely direct the current flowing into the water at either the inlet 118 or the outlet 120 as a result of the malfunction, back to ground at the circuit panel. The current collectors remain in the water pathway at all times and are hard-wired to ground allowing for continuous removal of any stray currents, however small.

The device 100 may also comprise a manual power switch 428 (see FIG. 4) for the pool pump 104, which turns power to the pump on or off. This switch 428 allows a user to turn the pool pump 104 on, overriding any of the controller's 110 active programs, including turning the heater element 106 off. This switch 428 may also override any of the controller's 110 active programs when the switch is turned off. In one embodiment, however, if the pool pump 104 is turned off and a timer program was previously active involving the pool heater element 106, the pool heater will remain off until the previously active timer program is reactivated (by a user for example).

I claim:

1. An above-ground pool heating device for minimizing energy usage by monitoring water temperature of a pool and optimizing heat transfer used to affect the water temperature to a target temperature based on environmental conditions, the device comprising:
   a user interface for receiving the target temperature;
   an interface for receiving environmental temperature information from at least one environmental sensor and for receiving water temperature information from a pool water temperature sensor; and
   a processor configured to control a heat element and a circulation pump based on the environmental temperature information to adjust the water temperature in order to meet the target temperature by:
   controlling a first stage of operation to contribute at least a portion of the heat transfer needed to increase the water temperature towards the target temperature when the environmental temperature information is determined to be sufficient to increase the pool water temperature by circulating the pool water without using the heat element, the processor configured in the first stage to disable the heat element while providing for circulation of water in the pool by activating the circulation pump to increase the pool water temperature, wherein the pool water temperature is increased in the first stage by transferring heat from outer walls of the above-ground pool, and
   controlling a second stage of operation of the heating element to increase the pool water temperature to reach the target temperature when the environmental temperature information is determined to be insufficient to reach target temperature, the processor configured in the second stage to activate the heating element while providing for circulation of water in the pool by activating the circulation pump.

2. The controller of claim 1, wherein a stage combination of the first stage and the second stage are selected from the group consisting of: the first stage followed by the second stage; the second stage followed by the first stage; and simultaneous implementation of the first stage and the second stage.

3. The controller of claim 2 further comprising a flow switch, the flow switch for determining the existence of a pre-determined minimum water flow rate of the circulation pump, the flow switch communicating to the processor, the processor activating the heating element during the second stage only when a sufficient flow rate of water exists.

4. The controller of claim 1, wherein the target temperature is a temperature range used in controlling the on and off operation of the circulation pump in the first stage.

5. The controller of claim 1, wherein the environmental temperature information used to determine a manner of operation of the heating element in the second stage includes information selected from the group comprising: an air temperature; a ground temperature; solar intensity; and amount of precipitation.

6. The controller of claim 5, wherein the environmental temperature information is selected from the group comprising: actual ambient conditions and weather forecasted ambient conditions.

7. The controller of claim 6 wherein the environmental temperature information includes at least one of a time of day or a calendar date.

8. The controller of claim 6, wherein the portion of the heat transfer of the first stage is calculated based on a temperature differential as defined by the environmental sensor and the pool water temperature sensor.

9. The controller of claim 1, the user interface for receiving a desired time period, and the processor configured for only activating the heating element to heat the pool water during the desired time period during the second stage based on the sensed environmental conditions.

10. A method for minimizing energy usage in controlling water temperature in an above-ground pool and optimizing heat transfer used to affect the water temperature to a target temperature based on environmental conditions, the method comprising:
   receiving the water temperature of the water in the pool;
   receiving environmental temperature information;
   receiving a target temperature range; and
   determining how to control a heat element and a circulation pump based on the environmental temperature information to adjust the water temperature in order to meet the target temperature by:
   controlling a first stage of operation to contribute at least a portion of the heat transfer needed to increase the water temperature towards the target temperature when the environmental temperature information is determined to be sufficient to increase the pool water temperature by circulating the pool water with the heat element disabled, the first stage operable by disabling the heat element while providing for circulation of water in the pool by activating the circulation pump to increase the pool water temperature, wherein the pool water temperature is increased in the first stage by transferring heat from outer walls of the above-ground pool, and
   controlling a second stage of operation of the heating element to increase the pool water temperature to reach the target temperature when the environmental temperature information is determined to be insufficient to reach target temperature.

11. The method of claim 10 wherein the environmental temperature information includes the time of day.

12. The method of claim 10 wherein the environmental temperature information includes a calendar date.

13. The method of claim 10 wherein the environmental temperature information includes solar intensity.

14. The method of claim 10 wherein the environmental temperature information includes precipitation measurements as forecasted predictions.

15. The method of claim 10 further comprising, receiving a target time period, the operation further optimizing the temperature of the pool water based on the target time period, the target temperature, the environmental temperature information, and the temperature of the water in the pool.

16. The method of claim 10, wherein a stage combination of the first stage and the second stage are selected from the group consisting of: the first stage followed by the second stage; the second stage followed by the first stage; and simultaneous implementation of the first stage and the second stage.

17. The controller of claim 1, wherein the environmental temperature information is determined to be sufficient when the environmental temperature information is greater than the pool water temperature.

18. The controller of claim 17, wherein the environmental temperature information is determined to be insufficient when the environmental temperature information is below the target temperature.

* * * * *